United States Patent
Yumoto et al.

(10) Patent No.: US 9,930,288 B2
(45) Date of Patent: Mar. 27, 2018

(54) INFORMATION RECORDING APPARATUS AND TAMPER PREVENTION METHOD FOR INFORMATION RECORDING APPARATUS

(71) Applicant: OLYMPUS CORPORATION, Hachioji-shi, Tokyo (JP)

(72) Inventors: Kenta Yumoto, Hachioji (JP); Hiroaki Miura, Hachioji (JP); Takafumi Onishi, Chofu (JP); Tetsuya Toyoda, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/161,539

(22) Filed: May 23, 2016

(65) Prior Publication Data

US 2016/0286158 A1 Sep. 29, 2016

Related U.S. Application Data

(63) Continuation of application No. PCT/JP2015/073803, filed on Aug. 25, 2015.

(30) Foreign Application Priority Data

Mar. 26, 2015 (JP) .................. 2015-064574

(51) Int. Cl.
| | | |
|---|---|---|
| *G06F 11/30* | (2006.01) | |
| *G06F 12/14* | (2006.01) | |
| *H04N 9/80* | (2006.01) | |
| *G06F 7/04* | (2006.01) | |
| *G06F 17/30* | (2006.01) | |
| *H04N 7/16* | (2011.01) | |
| *H04N 7/167* | (2011.01) | |

(Continued)

(52) U.S. Cl.
CPC ............. *H04N 5/913* (2013.01); *G06F 3/167* (2013.01); *H04N 9/8042* (2013.01); *H04N 2005/91357* (2013.01)

(58) Field of Classification Search
USPC ..................... 713/194; 726/26; 380/210, 236
See application file for complete search history.

(56) References Cited

U.S. PATENT DOCUMENTS

2005/0280723 A1 12/2005 Ohmura
2006/0123484 A1* 6/2006 Babic ...................... G06F 21/10
                                                              726/26

(Continued)

FOREIGN PATENT DOCUMENTS

JP  2000173185 A  6/2000
JP  2001086449 A  3/2001

(Continued)

*Primary Examiner* — Hung Dang
(74) *Attorney, Agent, or Firm* — Volpe and Koenig, P.C.

(57) ABSTRACT

An information recording apparatus, comprising: an information input unit configured to acquire audio data and/or image data; a tamper prevention unit that applies tamper prevention processing to the audio data and/or image data; and a controller that records, in a recording unit, both audio data and/or image data to which the tamper prevention processing is applied by the tamper prevention unit and audio data and/or image data to which the tamper prevention processing is not applied, if a predetermined condition is satisfied.

12 Claims, 9 Drawing Sheets

(51) Int. Cl.
*H04N 5/913* (2006.01)
*G06F 3/16* (2006.01)
*H04N 9/804* (2006.01)

(56) References Cited

U.S. PATENT DOCUMENTS

| | | | | |
|---|---|---|---|---|
| 2006/0161791 | A1* | 7/2006 | Bennett | G06F 12/1408 |
| | | | | 713/193 |
| 2007/0127771 | A1 | 6/2007 | Kaneda | |
| 2009/0300368 | A1* | 12/2009 | Zilberstein | G06F 21/62 |
| | | | | 713/190 |
| 2013/0156257 | A1* | 6/2013 | Anan | H04L 9/3247 |
| | | | | 382/100 |
| 2015/0026459 | A1* | 1/2015 | Divakar | H04L 63/0428 |
| | | | | 713/160 |
| 2016/0050341 | A1* | 2/2016 | Erdler | H04N 1/444 |
| | | | | 380/245 |
| 2016/0241807 | A1* | 8/2016 | Kovac | H04N 5/77 |

FOREIGN PATENT DOCUMENTS

| | | | |
|---|---|---|---|
| JP | 2004241938 A | 8/2004 | |
| JP | 2012048810 A | 3/2012 | |
| JP | 2013197889 A | 9/2013 | |
| WO | WO 2014/173588 A1 * | 10/2014 | H04N 1/444 |

* cited by examiner

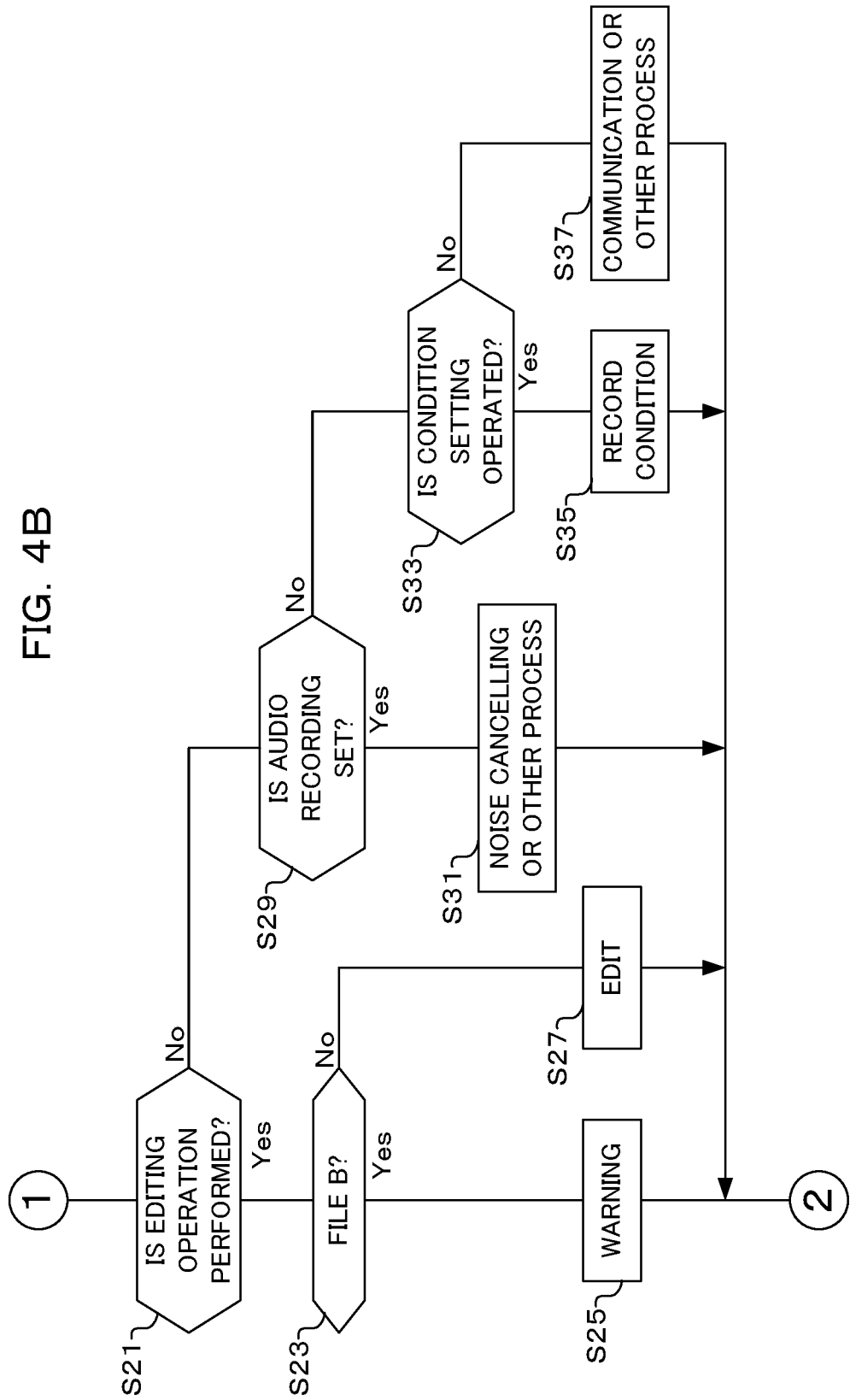

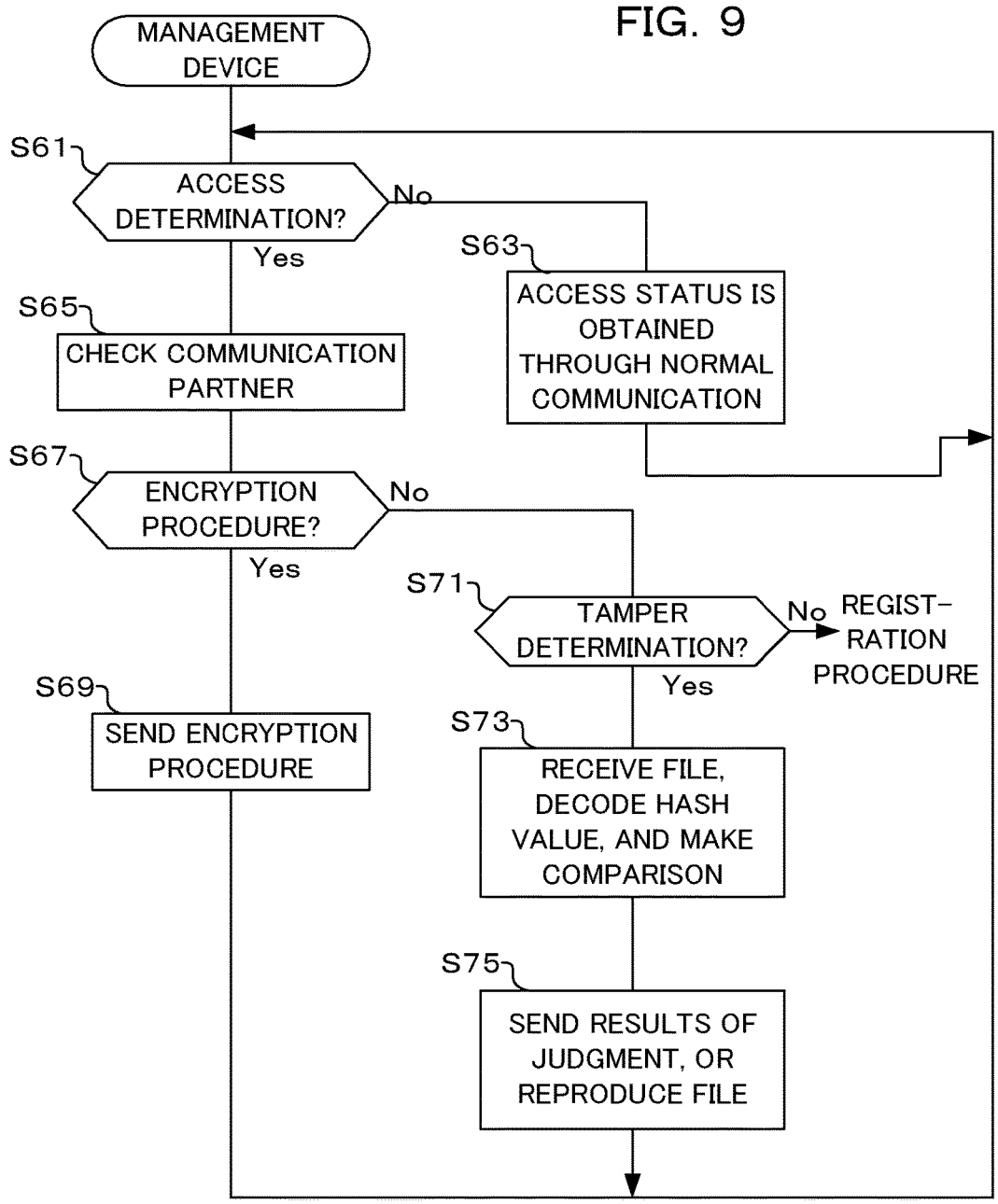

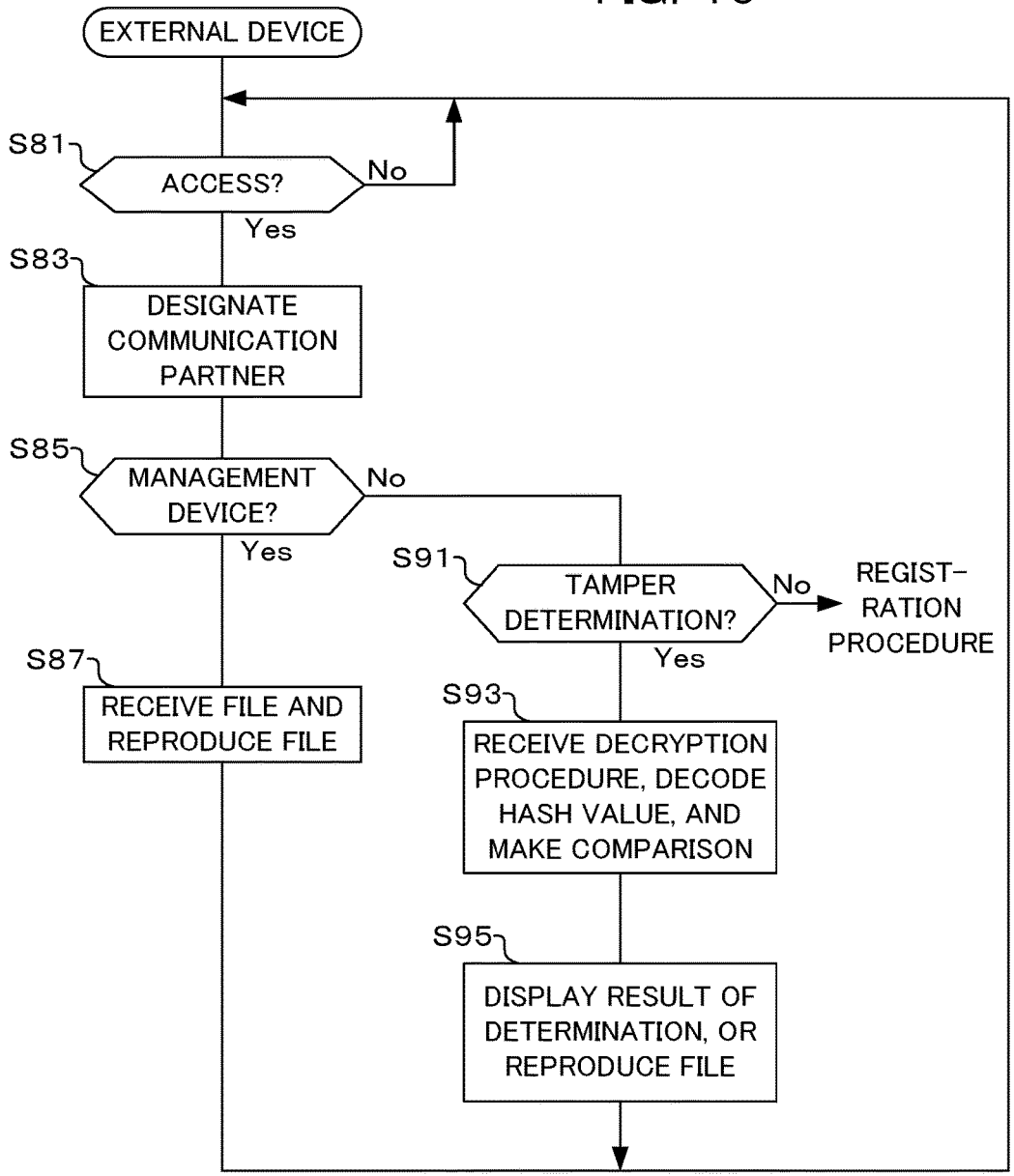

INFORMATION RECORDING APPARATUS AND TAMPER PREVENTION METHOD FOR INFORMATION RECORDING APPARATUS

CROSS-REFERENCE TO RELATED APPLICATIONS

This application is a Continuation Application of PCT Application No. PCT/JP2015/073803, filed on Aug. 25, 2015 and based upon and claiming the benefit of priority from prior Japanese Patent Application No. 2015-064574, filed on Mar. 26, 2015, the entire contents of all of which are incorporated herein by reference.

BACKGROUND OF THE INVENTION

1. Field of the Invention

The present invention relates to an information recording apparatus and a tamper prevention method (falsification preventing method) for the information recording apparatus, which performs tamper prevention processing when information such as audio and video is recorded.

2. Description of the Related Art

There is proposed an information recording apparatus that in recording information such as audio, in order to allow usage of the information as an evidence at a later date, performs tamper prevention processing in recording audio data (see, for example, Japanese Patent Laid-Open No. 2000-173185 (hereafter referred to as Patent Literature 1)).

In general, at the time of playing back audio data, in some cases, various types of editing processing such as deleting a time period in which audio or other data does not exist, or noise removing processing are performed. Furthermore, in some cases, at the time of playing back video image data, various types of editing processing such as deleting images in a time period during which images are disturbed or audio is not included, or noise removing processing are performed. In addition, in some cases, editing processing needs to be performed to extract a target audio or video from audio data or video image data.

However, in the case where tamper prevention processing is performed, for example, on audio data or video data at the time of recording audio or video, it is not possible to perform editing processing on the information after recording. As for information recorded at the time of audio recording or video recording, tamper prevention is not always necessary for all pieces of information recorded at the time of audio recording or video recording, and there are many cases where only decisive moments are important as an evidence. Nevertheless, editing processing cannot be not performed on the information recorded with information recording equipment having a tamper prevention processing function, which leads to a deterioration in operability thereof.

SUMMARY OF THE INVENTION

The present invention provides an information recording device, and a tamper prevention method for the information recording device having a tamper prevention function that exhibits improved operability when information such as audio data and image data is recorded.

An information recording apparatus according to a first aspect of the present invention includes: an information input unit configured to acquire audio data and/or video image data; a tamper prevention unit that applies tamper prevention processing to the audio data and/or video image data; and a controller that records, in a recording unit, both audio data and/or video image data to which the tamper prevention processing is applied by the tamper prevention unit and audio data and/or video image data to which the tamper prevention processing is not applied, if a predetermined designated period is satisfied.

A tamper prevention method for an information recording apparatus according to a second aspect of the present invention provides a tamper prevention method performed in an information recording apparatus, which includes: making a first determination as to whether or not audio data and/or video image data is being recorded; making a second determination as to whether or not a predetermined designated period at the time of tamper prevention is satisfied, if the audio data and/or video image data is being recorded as a result of the first determination; and recording, in a recording unit, with respect to the audio data and/or the video image data, both audio data and/or video image data to which tamper prevention processing is applied and audio data and/or video image data to which the tamper prevention processing is not applied, if the designated period is satisfied as a result of the second determination.

BRIEF DESCRIPTION OF THE DRAWINGS

FIG. 4B is a flowchart showing operations of the terminal device according to the embodiment of the present invention.

FIG. 9 is a flowchart showing operations of a management device according to the embodiment of the present invention.

FIG. 10 is a flowchart showing operations of an external device according to the embodiment of the present invention.

DETAILED DESCRIPTION OF THE PREFERRED EMBODIMENTS

Herein below, an embodiment according to the present invention will be described by giving an example in which the embodiment according to the present invention is applied to an information recording system. A terminal device of this information recording system includes a microphone for inputting audio data, and imaging elements for inputting image data, and can apply normal audio processing or image processing to the inputted audio data or image data of video to record them in a recording unit, without performing tamper prevention processing on these pieces of data. Furthermore, the terminal device includes a tamper prevention unit that performs the tamper prevention processing on audio data or image data. In the case where a predetermined condition at the time of tamper prevention is satisfied, the terminal device records, in the recording unit, data to which the tamper prevention processing has been applied by the tamper prevention unit, separately from data to which normal processing has been applied.

Figure 1:
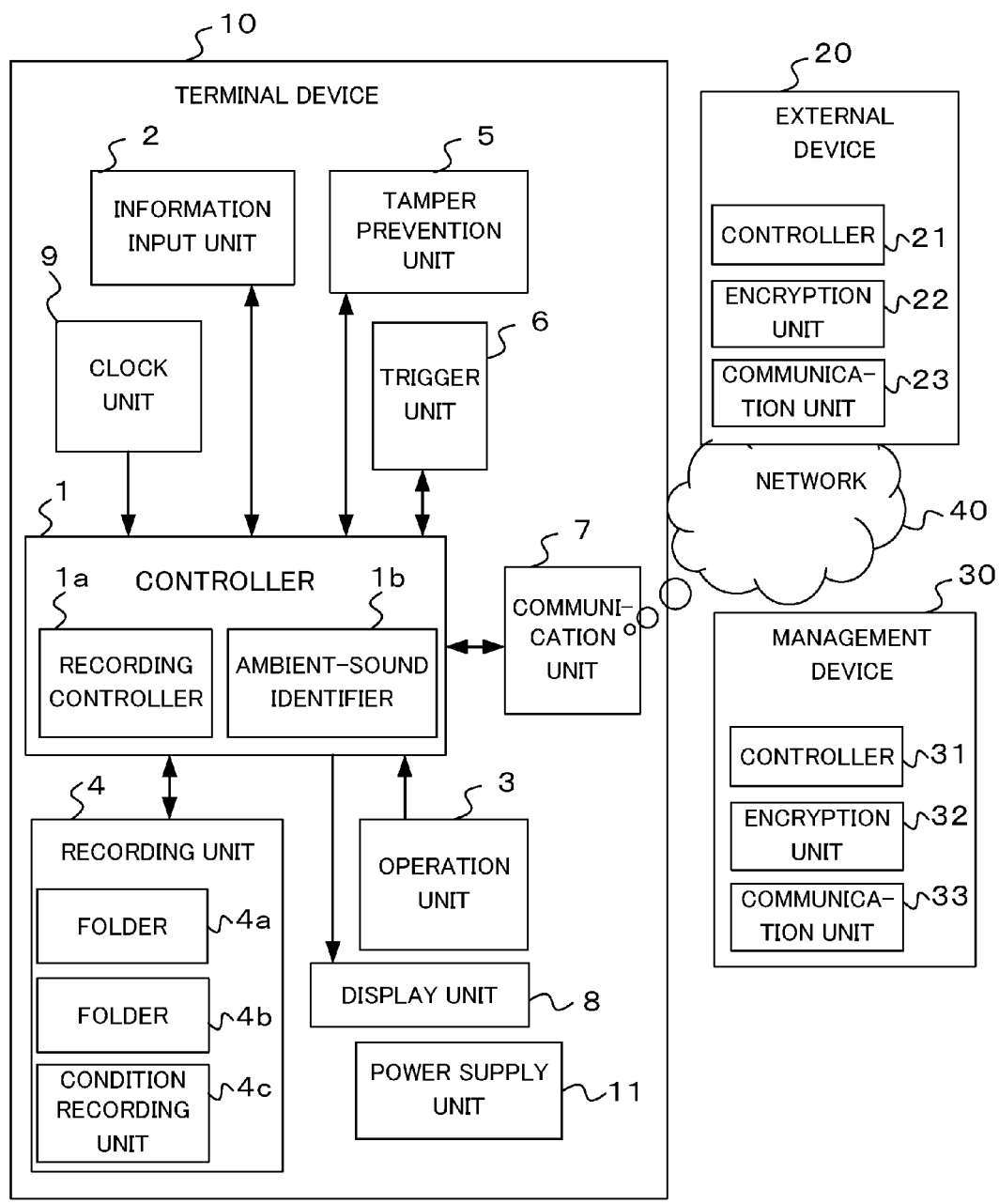
FIG. 1 is a block diagram mainly illustrating an electrical configuration of an information recording system according to an embodiment of the present invention.

FIG. 1 is a block diagram mainly illustrating an electrical configuration of the information recording system according to the embodiment of the present invention. This information recording system includes a terminal device 10, an external device 20, a management device 30, and a network 40 that connects these devices.

In FIG. 1, the terminal device 10 inputs and records audio data or image data. The external device 20 serves as a playback device for the audio data or the image data recorded by the terminal device 10, and, in the case of data subjected to tamper prevention processing, can display whether it is authenticated or not by the management device 30. The management device 30 performs, through the network 40, a registration procedure necessary for the terminal device 10 to perform the tamper prevention processing, and notifies the external device 20 whether the data is authenticated or not by the management device 30.

An information input unit 2 in the terminal device 10 includes a microphone for inputting audio data, an audio-data processing circuit for audio data inputted through this microphone, and the like. Furthermore, the information input unit 2 includes imaging elements for inputting image data, an imaging control circuit for the imaging elements, and the like. The audio data and the image data inputted and processed in the information input unit 2 are outputted to a controller 1. The information input unit 2 functions as an information input unit for acquiring audio data and/or image data.

A tamper prevention unit (falsification preventing unit) 5 applies known tamper prevention processing to the audio data and the image data inputted and processed by the information input unit 2, and outputs the resultant data to the controller 1. As for the tamper prevention processing, it is only necessary to use, for example, a hash function to perform the processing for every predetermined amount of data. Furthermore, it may be possible to apply encryption or other processing employing a duplicate key such as a secret key, to the data subjected to the tamper prevention processing. It maybe possible to further enhance the level of tamper prevention by performing encryption processing. The tamper prevention unit 5 functions as a tamper prevention unit that applies tamper prevention processing to audio data and/or image data.

It should be noted that the technique of tamper prevention can also be called a technique of electronic signature in view of transmission/reception. More specifically, this is because: an electronic signature encrypted with a secret key, content data such as an image and audio, and a public key are sent to a party on the other side; the recipient decrypts the electronic signature with the public key to generate a digest using a hash function from the sent content data; and it is possible to detect whether the data is tampered or not by comparison with the electronic signature. Herein below, description of tamper prevention includes a process of generating such a hash function and encryption with a secret key. Strictness and the like of encryption, a secret key, and a public key can be varied according to a requirement level required for them. Furthermore, it may be possible to employ a calculation for verifying data other than the hash function.

A clock unit 9 outputs date and time information to the controller 1. This date and time information is attached to audio data or image data and then is recorded as information at the time of inputting and generating the audio data or the image data. Furthermore, it maybe possible to use the date and time information as a timing for performing tamper prevention processing, as will be described later.

A trigger unit 6 triggers start or end of the tamper prevention processing for audio data or image data by the tamper prevention unit 5. If a condition recorded in a condition recording unit 4c is satisfied, the trigger unit 6 outputs a trigger to the controller 1, and the tamper prevention processing is performed, as will be described later (as for the condition for outputting the trigger, see, for example, S3 in FIG. 4A and FIG. 6).

A communication unit 7 is connected with the external device 20 and the management device 30 through the network 40, a USB terminal or the like, and outputs audio data or image data recorded in the recording unit 4. Furthermore, the communication unit 7 performs a registration procedure for tamper prevention processing with the management device 30.

An operation unit 3 includes operation members such as a recording button, a stop button, a playback button, an edit button, and a menu button in the case of handling audio data, and includes operation members such as a release button, a video button, a playback button, an edit button, and a menu button in the case of handling image data. The operation unit 3 detects operational states of these operation members, and outputs them to the controller 1. Furthermore, the operation unit 3 includes a tamper-prevention-processing instructing button (trigger button 3a) for giving an instruction to start or end the tamper prevention processing, and detects operational states of this tamper-prevention-processing instructing button (trigger button 3a) to output them to the controller 1 (as for operations of the trigger button 3a, see FIG. 2A and FIG. 2B).

A display unit 8 performs, for example, live view display, playback display, and menu screen display in the case of handling image data, and performs, for example, menu screen display in the case of handling audio data. Furthermore, the display unit 8 performs warning display indicating "being in process", in the case where tamper prevention processing is being performed. Furthermore, the display unit 8 includes a speaker for playback in the case of handling audio data. A power supply unit 11 includes a power-supply battery or the like, and supplies electric power to each unit in the terminal device 10.

The recording unit 4 includes a folder 4a, a folder 4b, and the condition recording unit 4c. The folder 4a is a folder for recording audio data or image data which is normally processed and is not subjected to tamper prevention processing. The folder 4b is a folder for recording audio data or image data which is subjected to the tamper prevention processing.

The condition recording unit 4c records predetermined conditions with which an instruction to start or end the tamper prevention processing is given in the trigger unit 6. As for the condition for starting or ending the tamper prevention processing, it may be possible to employ, for example, a configuration in which the tamper prevention processing is started if the trigger button 3a is pressed down, and the tamper prevention processing is ended if pressing down of the trigger button 3a is released.

For the predetermined condition for the tamper prevention processing, it may be possible to use a designated period designated by a user at the time of acquiring the audio data and/or image data. As a portion that requires the tamper prevention is limited to a certain specific portion as described above, this condition makes it possible to prevent waste of processing time or energy used to encrypt a silence portion or information portion where an image or audio does not change. Furthermore, this condition provides an effect of easily searching for an important portion by identifying a portion on which tamper prevention is performed. For similar reasons, those described below also achieve improvement of waste and enhancement of searching performance by not performing tamper prevention on whole of acquired information, but processing only specific portions thereof.

Furthermore, the predetermined condition may be provided such that on the basis of the date and time information from the clock unit 9, tamper prevention processing starts if a specific date and time set in advance arrives, and the tamper prevention processing ends if a specific date and time set in advance arrives.

In addition, the predetermined condition may be provided such that audio recognition processing is performed on audio data inputted by the information input unit 2 to start the tamper prevention processing if a specific phrase such as "start," "well," "nice to meet you," "please," and "yes, please" is inputted, and end the tamper prevention processing if a specific phrase such as "stop," "yes," "OK," and "end" is inputted.

Moreover, it may be possible to start the tamper prevention when a vibration detecting unit or the like is provided in the terminal device 10 and if a user shakes the terminal device 10 with a specific movement that is not normally applied, and to end the tamper prevention processing if the user shakes it again. In addition, it maybe possible to set various conditions such as a specific tapping operation set in advance, and specific touching operations.

The condition recording unit 4c records the conditions and the like described above as examples. These conditions may be recorded in a non-volatile memory at the time of shipment from a factory. However, in this embodiment, these conditions are set by a user as appropriate, for example, through a menu screen (see, for example, S35 in FIG. 4B). The condition recording unit 4c functions as a condition recording unit that records conditions set in advance for the tamper prevention unit to perform the tamper prevention processing. Conditions recorded in this condition recording unit can be set (see, for example, S35 in FIG. 4B).

The controller 1 includes, for example, a central processing unit (CPU), a peripheral circuit, and an electrically rewritable memory (for example, a flash ROM) that stores a program code, and controls each unit in the terminal device 10 in accordance with the program code. Furthermore, a processing unit for audio data or image data is provided within the controller 1, and the controller 1 includes, for example, an A/D converter, an image processing circuit, an image compression circuit, an image expansion circuit, an audio compression circuit, an audio expansion circuit, an image editing unit, and an audio editing unit.

In addition, the controller 1 includes a recording controller 1a and an ambient-sound identifier 1b. The function of each of these units is executed by the CPU, the peripheral circuit, and the program code described above. The recording controller 1a controls recording so as to record, in the folder 4b, data inputted by the information input unit 2 and subjected to audio processing or image processing, and record, in the folder 4b, data subjected to tamper prevention processing by the tamper prevention unit 5. Furthermore, it is possible to perform editing processing on data that is not subjected to the tamper prevention processing. The editing processing includes, for example, noise removing processing, and deleting part of data to perform editing operation.

The ambient-sound identifier 1b removes noise from audio data. The noise has specific frequency or specific waveform, and is continuous sound in some cases. Thus, data portions having these features are extracted and noise is removed. Note that, in the case where tamper prevention processing is performed, the noise removing processing is not performed (see FIG. 3A and FIG. 3B). In the tamper prevention processing, the original sound is faithfully recorded to enhance admissibility of evidence. Thus, editing processing such as noise removing processing is not performed.

Furthermore, the ambient-sound identifier 1b or the controller 1 removes image noise from image data. The ambient-sound identifier 1b functions as a noise-removing unit that removes ambient sound from audio data and/or removes image noise from image data. In the case where the tamper prevention unit performs the tamper prevention processing, removal of ambient sound and/or removal of image noise described above by the noise-removing unit is not allowed (see, for example, S7 in FIG. 4A and S41 in FIG. 5).

Figure 4A:
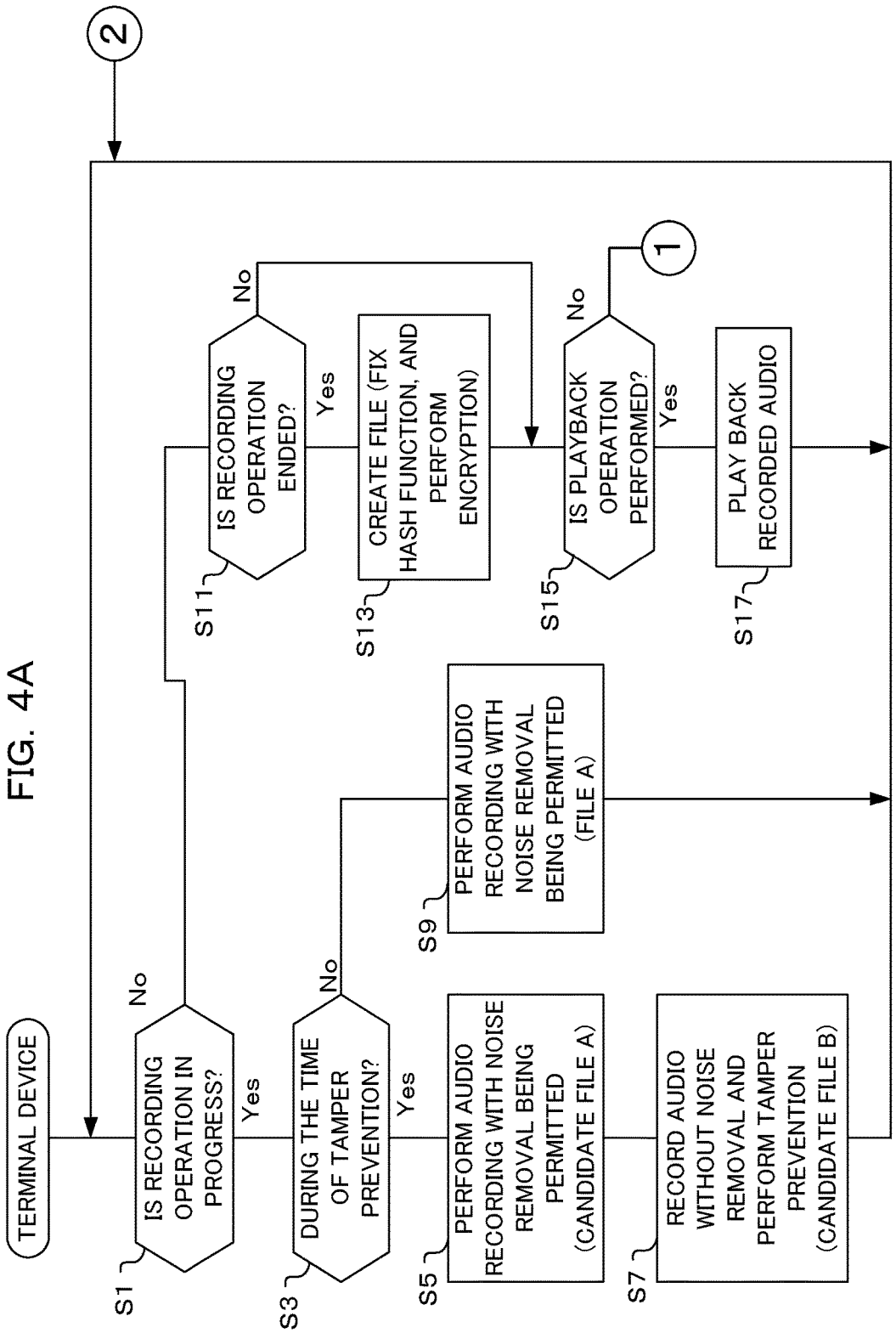
FIG. 4A is a flowchart showing operations of the terminal device according to the embodiment of the present invention.

The controller 1 functions as a controller that records, in the recording unit, both audio data and/or image data subjected to the tamper prevention processing by the tamper prevention unit, and audio data and/or image data not subjected to the tamper prevention processing, if a predetermined condition is satisfied (see, for example, S3 to S9 in FIG. 4A).

The external device 20 is, for example, a dedicated device that reproduces audio data or image data, or a personal computer that receives and reproduces audio data or image data. The external device 20 includes a controller 21, an encryption unit 22, and a communication unit 23.

The communication unit 23 communicates with the terminal device 10 through the network 40, and receives audio data or image data. Furthermore, the communication unit 23 receives audio data or image data from the terminal device, for example, through a USB terminal. Note that, the communication unit 23 may receive the audio data or image data indirectly, for example, through a server, rather than receiving the audio data or image data directly from the terminal device.

The encryption unit 22 decrypts image data that has been encrypted and already subjected to tamper prevention processing. As described above, encryption may be performed for tamper prevention processing in the case where the tamper prevention processing is performed by the tamper prevention unit 5. For this reason, this encryption unit 22 decrypts the image data that has been encrypted and already subjected to the tamper prevention processing as described above. The encryption unit 22 acquires data necessary for decoding from the management device 30.

The controller 21 includes, for example, a central processing unit (CPU), a peripheral circuit, and an electrically rewritable memory (for example, a flash ROM) that stores a program code, and controls each unit in the external device 20 in accordance with the program code.

Furthermore, the controller 21 performs playback processing on audio data or image data subjected to normal processing, and on audio data or image data subjected to tamper prevention processing in accordance with the program code. In addition, the controller 21 determines whether the tamper prevention processing is performed or not, and displays the results of determination. Moreover, the controller 21 performs editing processing on data not subjected to the tamper prevention processing.

The management device 30 is a server connected with the network 40, and sends, to the terminal device 10, data necessary to apply tamper prevention processing to audio data or image data in response to a request from the terminal device 10 (also referred to as a registration procedure). Furthermore, in response to a request from the terminal device 10 or the external device 20, the management device 30 determines whether or not data has been subjected to the tamper prevention processing, or outputs data for the determination. The management device 30 includes a controller 31, an encryption unit 32, and a communication unit 33.

The communication unit 33 communicates with the terminal device 10 and the external device 20 through the network 40. This communication includes sending, to the terminal device 10, data necessary for tamper prevention processing, and sending data for determining whether the tamper prevention processing is appropriately performed or not.

The encryption unit 32 sets rules necessary for encryption in performing the tamper prevention processing, and stores data for decrypting the encrypted data. The data necessary for encryption and decoding is sent after the terminal device 10 or the external device 20 is authenticated.

The controller 31 includes, for example, a central processing unit (CPU), a peripheral circuit, and an electrically rewritable memory (for example, a flash ROM) that stores a program code, and controls each unit in the management device 30 in accordance with the program code.

Furthermore, the controller 31 performs processing for sending data for the tamper prevention processing, to the terminal device 10 in accordance with the program code. In addition, the controller 31 determines whether the tamper prevention processing is performed or not, and outputs the results of determination, for example, to the external device 20. Moreover, the controller 31 outputs data for determining the tamper prevention processing, for example, to the external device 20.

Figure 2A:
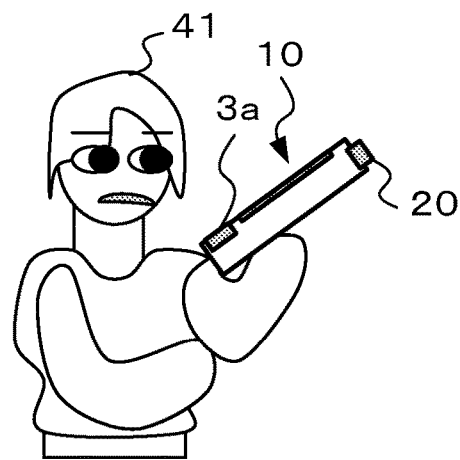
FIG. 2A and FIG. 2B are diagrams illustrating a usage state of a terminal device according to the embodiment of the present invention.

Next, a situation in which a user gives an instruction to perform tamper prevention processing will be described with reference to FIG. 2A and FIG. 2B. FIG. 2A shows how a user 41 records audio using the terminal device 10. In this case, the user 41 directs a microphone 2a, for example, at a speaker, and does not press down the trigger button 3a. In this state, the audio data inputted through the microphone 2a is normally processed, and is not subjected to the tamper prevention processing.

Figure 2B:
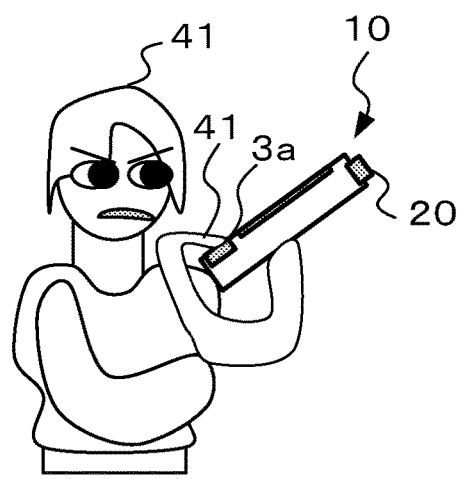

FIG. 2B shows a situation in which the user 41 considers it necessary to perform the tamper prevention processing, and presses down the trigger button 3a with a finger 41 to give an instruction to perform the tamper prevention processing. In this case, since the trigger button 3a is pressed down, audio data inputted through the microphone 2a is subjected to the tamper prevention processing and recorded in the folder 4b, whereas the audio data that has been normally processed and not subjected to the tamper prevention processing is recorded in the folder 4a. Furthermore, once pressing down of the trigger button 3a is released, the tamper prevention processing ends. Note that, in the case where a fingerprint sensor or the like is provided on the trigger button 3a or in the vicinity thereof, it is possible to obtain more credible evidence data with fingerprint information (biological information) on the user at this time.

Figure 3A:
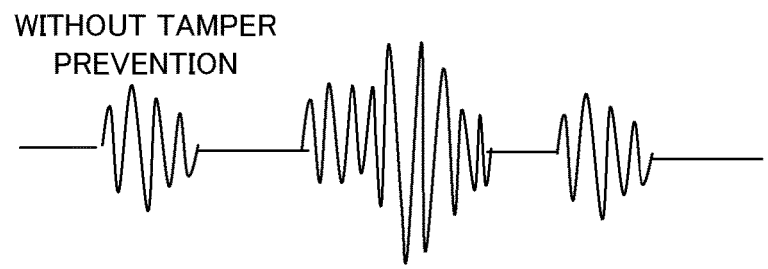
FIG. 3A and FIG. 3B are diagrams illustrating audio data in a case where tamper prevention processing is not applied to audio data for recording and in a case where it is applied thereto, in the terminal device according to the embodiment of the present invention.

Next, with reference to FIG. 3 and FIG. 3B, description will be made of a difference between a case where the tamper prevention processing is not applied to audio data and a case where it is applied thereto. FIG. 3A illustrates a case where audio is recorded from time t0 to time t9, and the tamper prevention processing is not performed. In the case where the tamper prevention processing is not performed, the ambient-sound identifier 1b performs noise removing processing. Thus, audio data takes zero during times t0 to t1, t2 to t4, t5 to t6, and t8 to t9 in which silence continues. On the other hand, audio data changes during times t1 to t2, t4 to t5, and t6 to t8 in which sound exists. Note that, since these portions can be used also for edition, dictation or the like, although these portions are only recorded, it is not necessary to limit the period of time for these portions to be short, which starts from t0 at which operation to start audio recording or video recording is performed.

Figure 3B:
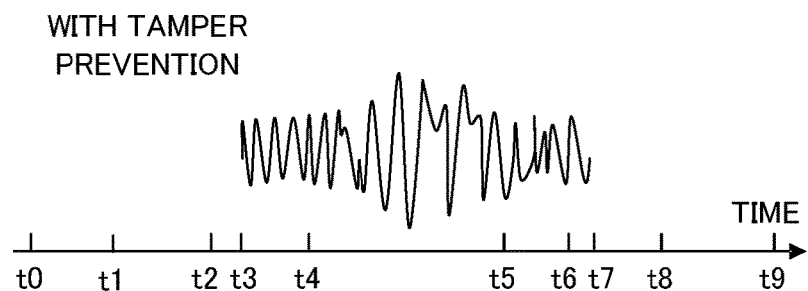

FIG. 3B illustrates a case where an instruction to start the tamper prevention processing is given at time t3, and an instruction to end the tamper prevention processing is given at time t7. In the case where the tamper prevention processing is performed, noise removing processing is not performed by the ambient-sound identifier 1b, and hence, audio data changes even during times t3 to t4 and t5 to t6 in which silence continues. These portions cannot be edited, and are difficult to be processed, and only processing performed for the purpose of evidence determination is allowed. Thus, it is preferable to limit a processing period of time as short as possible (t3 to t7), and to improve also searchability. Therefore, the fingerprint information or the like described above is also effective in improving tamper prevention and searchability.

Next, tamper prevention processing in the terminal device 10 according to this embodiment will be described with reference to the flowcharts shown in FIG. 4A, FIG. 4B, FIG. 5, and FIG. 6. These flowcharts are performed by the CPU in the controller 1 controlling each unit in the terminal device 10 in accordance with the program code stored in the memory in the controller 1. Note that, the terminal device 10 has imaging elements provided in the information input unit 2, and hence, can take in video or other image data. However, in the examples shown in FIG. 4A and FIG. 4B, only the case where audio data is taken in will be described.

Once the power-supply battery is loaded to the power supply unit 11 of the terminal device 10, the terminal device 10 starts to operate. Upon starting the operation, it is first determined whether or not recording operation is in progress (S1). Here, it is determined whether or not the recording button in the operation unit 3 is operated to start audio recording.

If it is determined as a result of determination in step Si that recording operation is in progress, it is then determined whether or not it is during the time of tamper prevention (S3). Conditions at the time of starting or ending the tamper prevention are recorded in the condition recording unit 4c, and the trigger unit 6 starts or ends the tamper prevention at a timing at which the recorded conditions are satisfied. In this step, determination as to whether the tamper prevention processing is in progress or not is made on the basis of output from the trigger unit 6. Detailed operations of this determination at the time of tamper prevention will be described later with reference to FIG. 6.

If it is determined as a result of determination in step S3 that it is not during the time of tamper prevention, audio is recorded with noise removal being permitted, and is recorded in the file A (S9). Here, since audio recording is performed with normal processing, audio data acquired by the information input unit 2 and normally processed is subjected to noise removing processing by the ambient-sound identifier 1b, and then, is recorded in the folder 4a as the file A.

On the other hand, if it is determined as a result of determination in step S3 that it is during the time of tamper prevention, audio is recorded with noise removal being permitted, and is recorded as a candidate file A (S5). The file A in step S9 is assumed to be formed into a file through a user operation, and recorded. Thus, in the case where operation for tamper prevention is instructed halfway during the recording, the flow is branched in step S3, and this portion of the file in step S9 is missing. For this reason, the recorded audio is described as the candidate file A so as to be able to be incorporated into the file A and be combined with the file A later. Furthermore, this portion may not be combined because a file B is enough. In addition, even in the case where operation for tamper prevention is instructed halfway, after all, there is a possibility that the decisive moment cannot be captured, and filing is not always necessary. Thus, the expression "candidate" is used. Setting as to whether or not combination is performed or filing is performed may be changed by a user later, or may be automatically determined depending, for example, on details of the recording or circumstances before and after the recording. Here, as in step S9, audio data acquired by the information input unit 2, normally processed, and then subjected to noise removing processing by the ambient-sound identifier 1b is recorded in the folder 4a as the file A.

Furthermore, in parallel with the audio recording with noise removal being permitted, audio data is recorded without noise removal and with tamper prevention processing, as a candidate file B (S7). Here, the audio data subjected to noise removing processing is recorded in the folder 4a, and in parallel with this, the tamper prevention unit 5 applies tamper prevention processing to the audio data acquired by the information input unit 2. The noise removing processing is not performed on the audio data subjected to the tamper prevention processing, and hence, noise as shown in FIG. 3B is superposed. The audio data subjected to the tamper prevention processing is recorded in the folder 4b as the file B. Details of the operation in step S7 will be described later with reference to FIG. 5.

It should be noted that the condition for tamper prevention set in advance may not only include the designated period designated by a user at the time of acquiring the audio data and/or image data but also include a period of time determined on the basis of a specific condition. As the portion where tamper prevention is necessary is limited to a certain specific portion as described above, this condition makes it possible to prevent waste of processing time or energy used to encrypt a silence portion or information portion where an image or audio does not change. Furthermore, this condition provides an effect of easily searching for an important portion by identifying a portion where tamper prevention is performed. For similar reasons, those described below also achieve improvement of waste and enhancement of searching performance by not performing tamper prevention on whole of acquired information, but processing only specific portions thereof. Noise components may be used as a circumstantial evidence. Furthermore, for example, in the case where tamper prevention includes, for example, fingerprint information at the time of operation, it is possible to obtain highly credible evidence data.

In the case where audio data is recorded with tamper prevention processing in step S7, the display unit 8 displays that the tamper prevention processing is being performed. A user can check whether the tamper prevention processing is being performed or not, by watching this display.

In the case where recording operation is in progress in step S1, it is then determined whether the recording operation is ended or not (S11). A user operates a stop button in the case of stopping the operation for audio recording, and hence, in this step, determination is made on the basis of whether the stop button is operated or not.

If it is determined as a result of determination in step S11 that recording operation is not ended, processing of steps S5 and S7 or step S9 is repeated to continue audio recording processing.

On the other hand, if it is determined as a result of determination in step S11 that recording operation is ended, a file is created, in other words, a hash function is fixed and encryption is performed (S13). In the case where the tamper prevention processing is performed in step S7, the hash function is updated and recording operation is ended. Thus, the tamper prevention unit 6 fixes the hash function. Furthermore, even in the case where the hash function is fixed, the function of tamper prevention deteriorates if the hash function is tampered, and hence, the tamper prevention unit 5 encrypts data for determining whether it is tampered or not.

If it is determined as a result of determination in step S11 that recording operation is not ended, or a file is created in step S13, it is then determined whether playback operation is performed or not (S15). Here, determination is made on the basis of whether the playback button in the operation unit 3 is operated or not.

If it is determined as a result of determination in step S15 that the playback operation is performed, the recorded audio is played back (S17). Here, the audio data recorded in the folders 4a and 4b is read, and the audio is played back from a speaker.

If it is determined as a result of determination in step S15 that the playback operation is not performed, it is determined whether editing operation is performed or not (S21 in FIG. 4B). If the edit button in the operation unit 3 is operated, the mode is switched to an editing mode.

If it is determined as a result of determination in step S21 that the editing operation is performed, it is determined whether a file B is designated or not (S23). It is determined whether or not the audio file designated at the time of editing is the file B, in other words, a file subjected to tamper prevention processing.

If it is determined as a result of determination in step S23 that the audio file is the file B, warning display is performed (S25). In the case where the tamper prevention processing is performed, tampering cannot be performed after audio recording. In order to notify the user of this, warning display is performed on the display unit 8. As described above, in this embodiment, it is not allowed to perform editing processing on audio data and/or image data subjected to the tamper prevention processing by the tamper prevention unit.

On the other hand, if it is determined as a result of determination in step S23 that the audio file is not the file B, editing is performed (S27). The editing may include various types of editing such as deleting a section designated through the operation unit 3. It may be possible to provide plural buttons for editing, and to allocate different editing functions to these buttons. Furthermore, it may be possible to perform various types of editing through a menu screen or the like.

If it is determined as a result of determination in step S21 that the editing operation is not performed, it is determined whether audio recording is set or not (S29). Here, it is determined whether or not the device is in an audio-recording setting mode. The audio-recording setting mode is set through the menu screen. Various settings such as a noise cancelling setting and an audio-recording quality setting are possible for the audio-recording setting.

If it is determined as a result of determination in step S29 that audio-recording setting is operated, audio-recording setting such as noise cancel is performed (S31). Here, audio-recording setting is performed according to settings inputted on the menu screen. Note that, in the case where noise cancel is set, the ambient-sound identifier 1b performs the noise removing processing.

If it is determined as a result of determination in step S29 that audio-recording setting is not operated, it is determined whether condition setting is operated (S33). As described above, conditions for tamper prevention processing in the trigger unit 6 are recorded in the condition recording unit 4c. It is determined whether or not to set the conditions to be recorded in the condition recording unit 4c. Conditions are set through the menu screen.

If it is determined as a result of determination in step S33 that condition setting is operated, the conditions are recorded (S35). Here, the conditions set through the menu screen are recorded in the condition recording unit 4c.

If it is determined as a result of determination in step S33 that condition setting is not operated, communication or other processing is performed (S37). Here, for example, various types of processing such as a registration procedure necessary for performing the tamper prevention processing, and acquisition of an encrypted hash function for performing the tamper prevention processing from the management device 30 are performed through the communication unit 7.

After processing through steps S7, S17, S25, S27, S31, S35, and S37 is performed, the flow returns to step S1.

As described above, with the terminal device 10 according to this embodiment, audio data is acquired. If it is during the time of tamper prevention, the acquired audio data is normally processed to be recorded in the folder 4a, and in parallel with this, the same audio data is subjected to the tamper prevention processing to be recorded in the folder 4b (see S5 and S7). Thus, if it is during the time of tamper prevention, with respect to the same audio data, there are generated two pieces of audio data: audio data subjected to the tamper prevention processing, and audio data not subjected to the tamper prevention processing.

Thus, in the case where editing processing is performed after audio data is acquired, it is only necessary to apply the editing processing to the audio data that is not subjected to the tamper prevention processing (see S27). The editing processing cannot be applied to the audio data subjected to the tamper prevention processing (see S23 and S25), and hence, it is possible to provide audio data having high admissibility of evidence.

Figure 5:
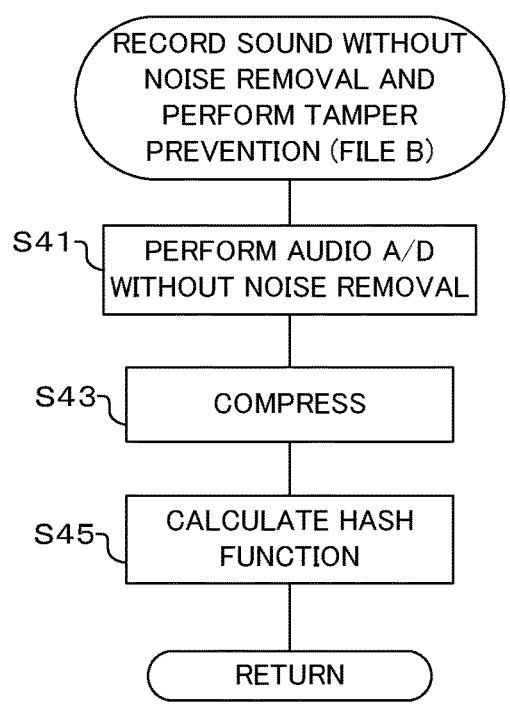
FIG. 5 is a flowchart showing operations of "audio recording without noise removal and tamper prevention" of the terminal device according to the embodiment of the present invention.

Next, operations of "sound recording without noise removal and tamper prevention" in step S7 will be described with reference to the flowchart shown in FIG. 5.

Once the operation enters this flow, audio A/D without noise removal is first performed (S41). Here, the ambient-sound identifier 1b does not perform noise removing processing on the audio data inputted through the information input unit 2, an A/D converter in the controller 1 A/D-converts audio data that is not subjected to the noise removing processing.

Then, compression is performed (S43). Here, the audio compression circuit in the controller 1 performs compression processing on the A/D-converted audio data in step S41.

Once compression processing is performed, a hash function is calculated on the basis of the data obtained at this time (S45). It is obvious that compression is not necessarily essential because this is an important audio. Here, the hash function is calculated for a certain amount of audio data (for example, one sector of audio data). This hash function may be encrypted so as to be based on the data acquired from the management device 30 in step S37. Note that, it is possible to enhance credibility of this data by acquiring it from the management device 30 every time tamper prevention is performed. However, these processes may be omitted, or the number of the processes may be increased as appropriate depending on a required level for tamper prevention or a required level for electronic signature. For encryption, it may be possible to employ, for example, biological information on a user, or generate data for encryption with a dedicated circuit. After the hash function is calculated, the operation returns to the original flow.

Figure 6:
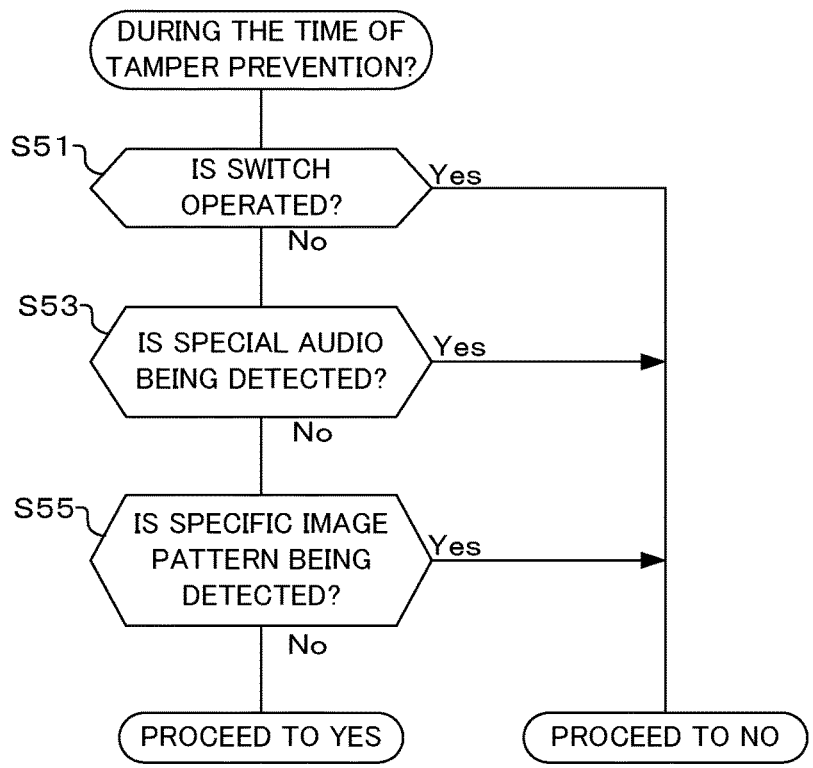
FIG. 6 is a flowchart showing operations for "during the time of tamper prevention?" of the terminal device according to the embodiment of the present invention.

Next, operations of "during the time of tamper prevention?" in step S3 will be described with reference to the flowchart shown in FIG. 6. Here, the trigger unit 6 determines whether or not to perform the tamper prevention processing, according to a condition recorded in the condition recording unit 4c. FIG. 6 shows one example of the condition for tamper prevention.

Once the operation enters this flow, it is first determined whether switch is operated or not (S51). Here, it is determined whether the trigger button in the operation unit 3 is pressed down or not. As described above, in the case where a user wishes to record audio data subjected to the tamper prevention processing, the user keeps pressing down the trigger button during that time.

If it is determined as a result of determination in step S51 that switch is not operated, it is determined whether special audio is being detected or not (S53). Here, it is determined, through audio recognition, whether or not the inputted audio data is a predetermined phrase such as "well," "nice to meet you," "please," and "yes, please."

If it is determined as a result of determination in step S53 that special audio is not being detected, it is determined whether a specific image pattern is being detected or not (S55). In the case where imaging elements are provided as the information input unit 2, determination is made on the basis of whether or not an image acquired with these imaging elements is the predetermined specific image pattern.

If determination in any of steps S51, S53, and S55 results in Yes, the flow proceeds to "Yes" in step S3. On the other hand, if determination in step S55 results in No, the flow proceeds to No in step S3.

As described above, at the time of determination as to "during the time of tamper prevention?", the trigger unit 6 makes the determination according to conditions for a tamper prevention time recorded in advance in the condition recording unit 4c. Note that, FIG. 6 shows one example of condition determination. However, in addition to this, it may be possible to add other conditions . For example, it may be possible to start and end the tamper prevention at a predetermined date and time using date and time information from the clock unit 9. Furthermore, it may be possible to provide a vibration detecting unit in the terminal device 10, and to start or end the tamper prevention if a user moves the terminal device 10 with a pattern that does not occur in a normal time. In addition, in place of the trigger button 3a, it may be possible to detect a touching operation with the touch panel on the display unit 8, or start or end the tamper prevention when the vibration detecting unit detects tapping operations.

Figure 7:
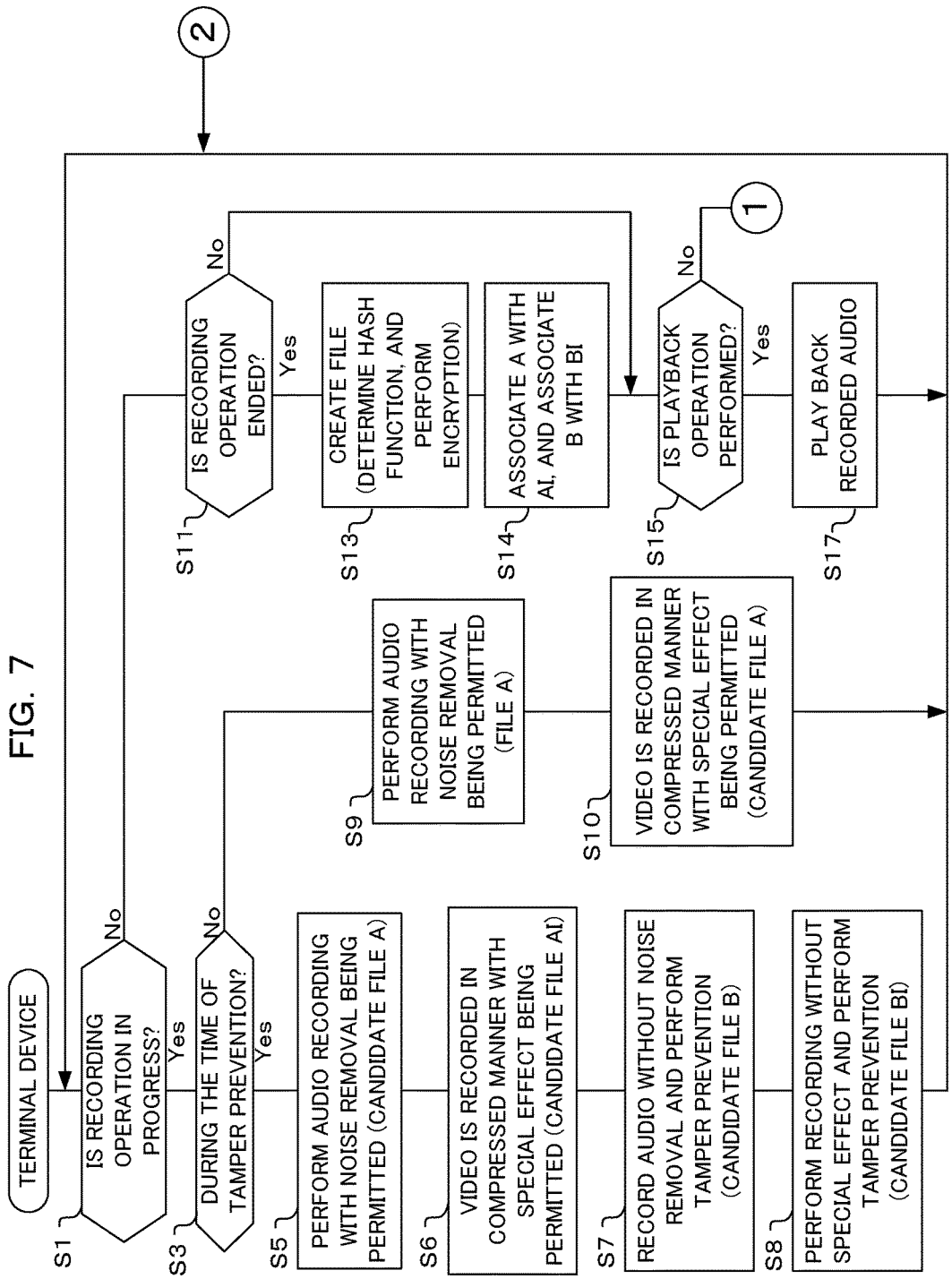
FIG. 7 is a flowchart showing a modification example of the operations of a terminal device according to the embodiment of the present invention.

Next, a modification example of the operations of the terminal device 10 will be described with reference to the flowchart shown in FIG. 7. In the embodiment according to the present invention shown in FIGS. 4A and 4B, audio data is inputted through the information input unit 2, and is recorded in the recording unit 4. In this respect, in this modification example, image data of video is inputted through the information input unit 2 in addition to audio data, and the audio data and the image data of video are recorded in the recording unit 4.

In this modification example, steps S6, S8, S10, and S14 are only added to FIG. 4A, and hence, these differences are mainly described. Note that, it may be possible to set later whether step S10 is necessary.

If it is determined as a result of determination in step S3 that it is during the time of tamper prevention, audio is recorded with noise removal being permitted, and a candidate file A is generated (S5). Then, video is recorded in a compressed manner with special effect being permitted, and a candidate file AI is recorded (S6). In this step, image data is acquired with the imaging elements in the information input unit 2, compressed with special effect being permitted, and thus recorded. Note that, the special effect is called a so-called art filter, and image data with special effect obtained with an optical filter being loaded or with special effect similar to that applied at the time of film development is generated by an image processing unit in the controller 1.

After video is recorded in step S6 in a compressed manner with special effect being permitted, sound is then recorded without noise removal, and tamper prevention is performed, so that the file thus obtained is recorded as a candidate file B (S7). Video is recorded without special effect, and tamper prevention is performed, so that the file thus obtained is recorded as a candidate file BI (S8). In this step, image data is acquired with the imaging elements in the information input unit 2, application of special effect is not permitted, compression processing is not performed, tamper prevention processing is performed, and thus the resultant image data is recorded.

Furthermore, if it is determined as a result of determination in step S3 that it is not during the time of tamper prevention, audio is recorded with noise removal being permitted, and is recorded as the file A (S9). Then, as in step S6, video is recorded in a compressed manner with special effect being permitted (S10).

If it is determined as a result of determination in step Si that recording operation is in progress, it is determined whether recording operation is ended or not (S11). If it is determined as a result of this determination that recording operation is ended, a file is created (S13), and A and AI, and B and BI are associated with each other (S14). In this step S14, the file A generated in step S5 and the file AI generated in step S6 are associated with each other. Furthermore, the file B generated in step S7 and the file BI generated in step S8 are associated with each other. The files A and AI relate to audio and image data that are not subjected to tamper prevention but are processed normally, whereas the files B and BI relate to audio and image data subjected to tamper prevention. This is because it is desirable to process these files in a paired state.

Steps other than steps S6, S8, S10, and S14 are similar to those shown in FIG. 4A and FIG. 4B, except that processing for image data is added, and hence, detailed explanation thereof will not be made. For example, in step S17, reproduction of images may be performed in addition to playback of audio. Furthermore, in step S27, editing image data may be performed in addition to editing audio data.

As described above, in this modification example, in the case where image data on video is acquired and an instruction to perform the tamper prevention processing is given, data that is not subjected to tamper prevention processing and data subjected to tamper prevention processing are generated for both audio data and image data, and these pieces of data are recorded. Thus, image data on video can be edited even after the date is recorded, which leads to an improvement in operability.

It should be noted that, in the case where image data is compressed and recorded, it may be possible to record video and also record image data on still image at the time when a release button is operated. If image data on still image is recorded as RAW image data in this case, compression or other processing is not necessary, which some users prefer to do. Thus, it may be possible to employ such a configuration. Furthermore, in the case where image data on video is compressed and recorded, there occurs a difference between a reference image (frame) and a difference image (frame). In a strict sense, usage or image quality varies from frame to frame. Thus, it may be possible to continue reference images and reduce the number of difference images or create no difference image in an important scene such as tamper prevention, and are reduced. It is obvious that tamper prevention may be performed only on the reference images.

Next, the structure of an audio file will be described with reference to FIG. 8. The audio file 50 includes an audio data 51 and a relevant information file 52. The audio data 51 is acquired through a microphone of the information input unit 2, and is subjected to audio processing. The audio data 51 contains both audio data subjected to tamper prevention processing and audio data not subjected to tamper prevention processing.

Information related to the audio data 51 is recorded in the relevant information file 52. The relevant information file 52 includes a relevant-image file name 53, a relevant-audio file name 54, an encryption hash portion 55, a management device address name 56, and an audio managing information 57.

In the relevant-image file name 53, a relevant-image file name of image data recorded together with the audio data 51 is recorded during recording of the audio data 51. A name of a relevant audio file is recorded in the relevant-audio file name 54. As a relationship between a file with tamper prevention and a file without tamper prevention is easily recognizable, it is possible to search for one file from the other file, which achieves easy handling. The encryption hash portion 55 encrypts a hash function at the time of performing tamper prevention processing, and the encrypted hash function is recorded. Encryption is performed because, even if tamper prevention processing is performed as described above, data is tampered if the hash function is identified. Thus, encryption is performed to prevent this situation.

In the case where the management device is provided, public organizations or third party organization offer management/operation services of secret keys or public keys, and it is possible to establish a mechanism concerning tamper prevention or electronic signature having improved reliability, as a system. The management device address name 56 acquires data for performing the tamper prevention processing from the management device 30, and records an address of the management device 30 on the network. The audio managing information 57 records date and time information, location information and the like when the audio data is recorded. A position detector such as a global positioning system (GPS) is provided in the terminal device 10, and detects the location information.

Figure 8:
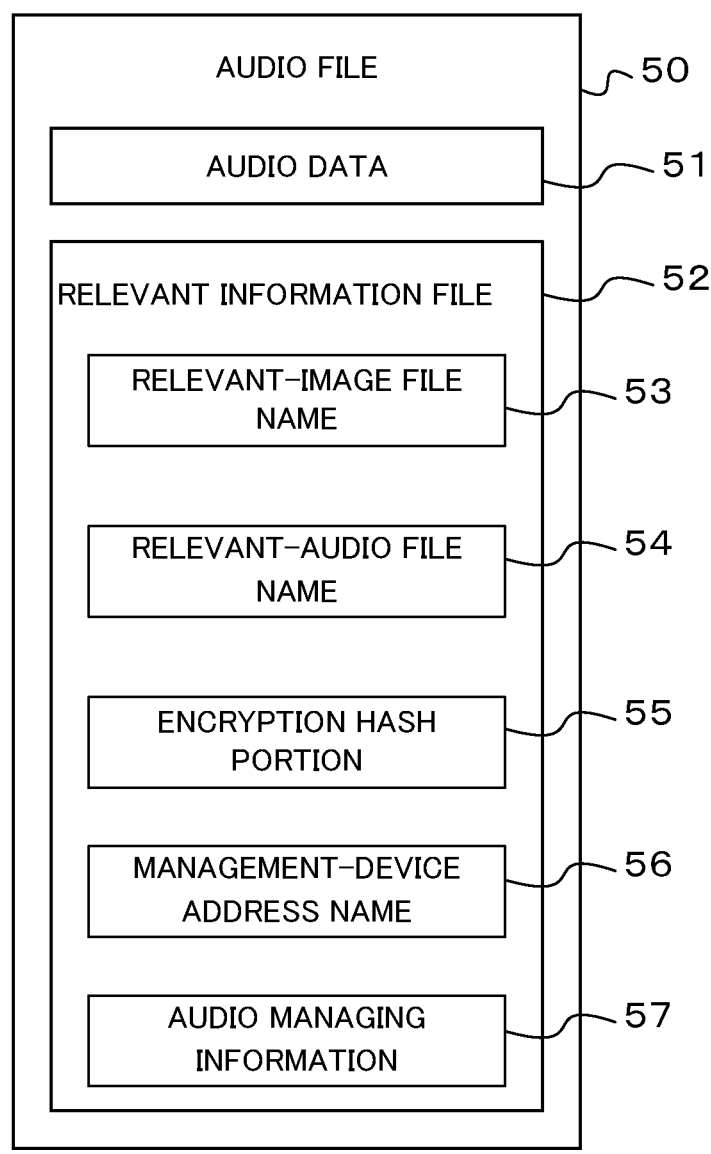
FIG. 8 is a diagram illustrating the structure of an audio file in the terminal device according to the embodiment of the present invention.

It should be noted that no image file is shown in FIG. 8. However, it is only necessary that an image file is generated and recorded as with the audio file in the case where image data is acquired with the imaging elements and is recorded.

Next, operations of the management device 30 in the embodiment according to the present invention will be described with reference to the flowchart shown in FIG. 9. This flowchart is performed in a manner such that the CPU in the controller 31 controls each unit in the management device 30 in accordance with the program code stored in the memory in the controller 31.

Once the operation enters this flow, access determination is first made (S61). Here, it is determined whether or not there is any access to the management device 30 through the communication unit 7 of the terminal device 10 or the communication unit 23 of the external device 20. If it is determined as a result of this determination that there is no access, the access status is obtained through a normal communication (S63). Here, it is always monitored whether or not there is any access from the terminal device 10 or the external device 20.

If it is determined as a result of determination in step S61 that access exists, a communication partner is checked (S65). Here, it is identified which device of a large number of terminal devices 10 or external devices 20 has accessed the management device 30.

Once the communication partner is identified, it is then determined whether encryption procedure is required or not (S67). As described above, in this embodiment, in order to enhance credibility of tamper prevention processing, encryption processing is allowed to be applied to data for the tamper prevention. In this step, it is determined whether or not transmission of data for encryption procedure is required.

If it is determined as a result of determination in step S67 that encryption procedure is required, encryption procedure transmission is performed (S69). Here, data for encryption is transmitted to the communication partner, which is identified in step S65. Once encryption procedure is transmitted, the flow returns to step S61.

If it is determined as a result of determination in step S67 that encryption procedure is not required, it is determined whether or not tamper determination is required (S71). In some cases, the external device 20 may request determination as to whether audio data or image data is tampered or not. Here, it is determined whether this request is received or not.

If it is determined as a result of determination in step S71 that tamper determination is required, a file is received, a hash value is decoded, and comparison is made (S73). Here, audio data or image data is sent from the external device 20, and an encrypted hash value is decoded. Then, the decoded hash value is compared with the original hash value to determine whether the hash value is tampered or not. If it is tampered, the hash value itself is not matched, and digest information on contents such as the encrypted hash value or electronic signature is not matched as well. Thus, tamper determination can be made. By employing a configuration in which a secret key is required at the time of encrypting the electronic signature, also decryption becomes difficult.

Then, results of determination are sent, or the file is reproduced (S75). Here, the played back audio or video is not tampered. Thus, it is possible to use it as a circumstantial evidence or the like, and hence, it is possible to employ it reliably at the time of making important judgment of the situation such as court or contract. Here, results of determination in step S73 are sent to the external device 20 of the communication partner. Once processing in step S75 is performed, the flow returns to step S61.

If it is determined as a result of determination in step S71 that tamper determination is not required, a registration procedure or other processing is performed. This registration procedure includes registering a target device, for example, to a public organization, and making a contract with regards to receiving various services concerning encryption and electronic signature, and paying service fees for the services. It is obvious that it may be possible to use a service in which target audio or video is securely managed. As described above, the terminal device 10 requests the management device 30 to send the data used for tamper prevention every time tamper prevention processing is performed, and hence, the management device 30 performs processing for this.

As described above, the management device 30 sends the data used for tamper prevention, to the terminal device 10. In the case where encryption procedure is requested, the management device 30 sends data for the encryption procedure. In addition, in the case where tamper determination is made, the management device 30 sends the results of determination.

Next, operations of the external device 20 in the embodiment according to the present invention will be described with reference to the flowchart shown in FIG. 10. This flowchart is performed with the CPU in the controller 21 controlling each unit in the external device 20 in accordance with the program code stored in the memory in the controller 21.

Once the operation enters this flow, it is first determined whether or not to make access (S81). Here, it is determined whether or not the external device 20 makes access through the communication unit 7 of the terminal device 10 or the communication unit 23 of the external device 20. If it is determined as a result of this determination that it does not make access, determination as to whether or not the external device 20 makes access is made at all times.

If it is determined as a result of determination in step S81 that it makes access, the communication partner is designated (S83). Here, any of the large number of terminal devices 10 or management devices 30 is designated.

Once the communication partner is designated, it is then determined whether the designated communication partner is the management device 30 or not (S85). If the management device is operated by a third party, more impartial tamper determination system can be expected during contract between two parties, in court, or in other situations. Here, it is determined whether or not the designated communication partner is the management device 30 that the external device 20 requests in S71 in FIG. 9 to make tamper determination.

If it is determined as a result of determination in step S85 that the designated communication partner is the management device, a file is received and is reproduced (S87). Here, a file based on the results of determination made by the management device 30 as to tamper prevention is received, and is reproduced. It may be possible to make reproducible a file tampered with such a mechanism in the first place.

After the processing in step S87 is performed, the flow returns to step S81. Note that, it may be possible to generate the file in the management device.

On the other hand, if it is determined as a result of determination in step S85 that the designated communication partner is not the management device, it is determined whether tamper determination is required or not (S91). The tamper prevention can be made within the external device 20 rather than requesting the management device to do so, provided that information concerning a decoding procedure for determination is available.

If it is determined as a result of determination in step S91 that tamper determination is required, a decoding procedure is then received, a hash value is decoded, and comparison is made (S93). Here, on the basis of the comparison result, it is determined whether the hash value is tampered or not.

Once determination as to whether the hash value is tampered or not in step S93, results of determination are displayed, or a file is reproduced (S95). Here, for example, "not tampered" or "tampered" is displayed in accordance with the results of determination in step S93. After the processing ends, the flow returns to step S81.

If it is determined as a result of determination in step S91 that tamper determination is not required, the registration procedure described above is performed. In other words, this registration procedure includes registering a target audio recording device, video recording device, and user to a public organization, a third party organization or the like, and making a contract with regards to receiving various services including encryption or issuing a secret key for electronic signature appropriate to the device or the user, and paying service fees for the services. It is obvious that it may be possible to use a service in which target audio, video or other content data is securely managed, or to store or guarantee the content data.

As described above, in the external device 20, it is possible to check whether audio data or image data recorded in the terminal device 10 is tampered or not.

As described above, the embodiment according to the present invention includes: the information input unit 2 configured to acquire audio or image data; the tamper prevention unit 5 that applies tamper prevention processing to the audio data and/or the image data; and the controller 1 that records, in the recording unit, both audio data and/or image data subjected to the tamper prevention processing by the tamper prevention unit and audio data and/or image data not subjected to the tamper prevention processing, if a predetermined condition is satisfied. Thus, the tamper prevention function can be conveniently used at the time of recording information such as audio data or image data. More specifically, in the case where video or audio is recorded for a long period of time, tamper prevention processing is applied, during a necessary period of time, to the audio data or image data, and during this period of time, audio data or image data that is not subjected to the tamper prevention processing is recorded. With this configuration, the data subjected to the tamper prevention processing can be used as an evidence, and editing processing can be performed on the data not subjected to the tamper prevention processing.

Furthermore, the embodiment according to the present invention includes: making a first determination as to whether audio data and/or image data is being recorded or not (for example, S1 in FIG. 4A); if recording is in progress as a result of the first determination, making a second determination as to whether a condition at the time of tamper prevention set in advance is satisfied or not (for example, S3 in FIG. 4A); and if the condition is satisfied as a result of the second determination, recording, in a recording unit, both audio data and/or image data (for example, S7 in FIG. 4A) subjected to tamper prevention processing and audio data and/or image data (for example, S5 in FIG. 4A) not subjected to the tamper prevention processing, with respect to the audio data and/or the image data. Thus, the tamper prevention function can be conveniently used at the time of recording information such as audio data or image data. In other words, the data subjected to the tamper prevention processing can be used as an evidence, and editing processing can be applied to the data not subjected to the tamper prevention processing.

It should be noted that, in the embodiment according to the present invention, the registration procedure is performed on the management device 30 every time the tamper prevention processing is applied thereto. However, depending on, for example, contract with the management device 30, the registration procedure may not be performed every time. Furthermore, encryption processing is performed to enhance credibility of the tamper prevention processing. However, encryption processing may be omitted.

Furthermore, in the embodiment according to the present invention, for example, the tamper prevention unit 5, the trigger unit 6 and the like are provided separately from the controller 1. However, it is obvious that all or part of the units are configured as software, which is executed by the CPU in the controller 1.

Furthermore, in this embodiment, description has been made using a digital camera as a device for capturing images. However, for the camera, it may be possible to use a digital single-lens reflex camera, or a compact digital camera, or a camera for video such as a video camera and a movie camera, or a camera incorporated in a mobile phone, a smartphone, a mobile information terminal (PDA: Personal Digital Assist), a personal computer (PC), a tablet-type computer, a gaming device, or other devices. In any cases, application of the present invention is not limited to a consumer field, industrial field, or medical field, and the present invention can be applied to any device or system having a tamper prevention function and configured to record information. As with surveillance cameras or inspection cameras, it may be possible to employ a configuration in which recording is continuously performed, and determination is made according to situations to create a file with tamper prevention.

Furthermore, in the techniques described in this DESCRIPTION, the controls, which have been described mainly with reference to the flowcharts, can be usually set with programs, and the programs may be stored in a recording medium or recording unit. As for the way of recording the programs to the recording medium or the recording unit, it may be possible to record them at the time of shipment of the product, or use a distributed recording medium, or download them through the Internet.

Furthermore, in connection with the operational flows in CLAIMS, DESCRIPTION, and the drawings, "first," "then" or other expressions implying the sequential order are used for the purpose of convenience. However, unless otherwise specified, use of these expressions does not mean that it is essential to perform the flow in this sequential order.

As understood by those having ordinary skill in the art, as used in this application, 'section,' 'unit,' 'component,' element, 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not directly limited to the embodiment described above. At the time of carrying out the present invention, it is possible to embody the present invention by modifying the constituent elements without departing from the main point of the present invention. Furthermore, various inventions can be formed by appropriately combining plural constituent elements disclosed in the embodiment described above. For example, it may be possible to delete some constituent elements out of all the constituent elements disclosed in the embodiment. In addition, it may be possible to appropriately combine the constituent elements in different embodiments.

What is claimed is:

1. An information recording apparatus, comprising:
    an information input configured to acquire at least one of audio data and video image data;
    a tamper preventer that applies tamper prevention processing to the at least one of the audio data and video image data;
    a controller that records in a recorder when a predetermined designated period is satisfied, both:
        the at least one of the audio data and video image data to which the tamper prevention processing is applied by the tamper prevention unit; and
        the at least one of the audio data and video image data to which the tamper prevention processing is not applied; and
    a condition recorder that records the predetermined designated period for the tamper preventer to perform the tamper prevention processing, wherein
    a condition to be recorded in the condition recorder can be set by a user.

2. The information recording apparatus according to claim 1, wherein
    the predetermined designated period is a designated period designated by a user at the time of acquiring the at least one of the audio data and video image data.

3. The information recording apparatus according to claim 1, further comprising:
    a noise remover that removes ambient sound from the audio data, and removes image noise from the video image data, wherein
    removing the ambient sound or removing the image noise by the noise remover is not permitted in a case where the tamper prevention processing is applied by the tamper preventer.

4. The information recording apparatus according to claim 1, wherein
    a display displays an indicator when execution of the tamper prevention processing is performed by the tamper preventer.

5. The information recording apparatus according to claim 1, wherein
    encryption processing is performed on data for the tamper preventer to perform the tamper prevention processing.

6. The information recording apparatus according to claim 1, wherein
    execution of editing processing on the at least one of the audio data and video image data on which the tamper prevention processing has been executed by the tamper preventer is not permitted.

7. The information recording apparatus according to claim 1, wherein the information input is at least one of a audio receiver and an imager.

8. The information recording apparatus according to claim 7, wherein the audio receiver is a microphone and the imager is a camera.

9. The information recording apparatus according to claim 1,
    further comprising a button to start or end the tamper prevention processing by the tamper preventer.

10. The information recording apparatus according to claim 9, wherein the button is actuated to start the tamper prevention processing by the tamper preventer and released to stop the tamper prevention processing by the tamper preventer.

11. The information recording apparatus according to claim 1, wherein the predetermined designated period may be based on at least one of user actuation, timing information, audio command, and motion detection.

12. A tamper prevention method in an information recording apparatus, comprising:
    acquiring at least one of audio data and video image data;
    applying tamper prevention processing to the at least one of the audio data and video image data;
    making a first determination as to whether the at least one of the audio data and video image data is being recorded;
    making a second determination as to whether a predetermined designated period at the time of tamper prevention processing is satisfied, if the at least one of the audio data and video image data is being recorded as a result of the first determination;
    recording, in a recorder comprising a condition recorder, with respect to the at least one of the audio data and video image data, when the predetermined designated period is satisfied as a result of the second determination, both:
        the at least one of the audio data and video image data to which tamper prevention processing is applied, and
        the at least one of the audio data and video image data to which the tamper prevention processing is not applied;
    recording in the condition recorder, the predetermined designated period to perform tamper prevention processing, and
    setting a condition to be recorded in the condition recorder for the tamper prevention processing to be performed.

* * * * *